United States Patent [19]

Kornides

[11] Patent Number: 5,297,882
[45] Date of Patent: Mar. 29, 1994

[54] LIQUID DISPENSING BRUSH WITH CAM VALVE

[76] Inventor: James R. Kornides, 1913 Fairwood La., State College, Pa. 16803

[21] Appl. No.: 10,345

[22] Filed: Jan. 28, 1993

[51] Int. Cl.$^5$ .............................................. A46B 11/02
[52] U.S. Cl. .................................. 401/184; 132/112; 132/113; 401/186; 401/270; 401/277; 401/281
[58] Field of Search .............. 401/270, 281, 277, 184, 401/186; 132/112, 113, 114

[56] References Cited

U.S. PATENT DOCUMENTS

| | | | |
|---|---|---|---|
| 513,071 | 1/1894 | Baldwin | 401/277 |
| 1,449,096 | 3/1923 | Grieten | 132/114 |
| 1,852,617 | 4/1932 | Lamothe | 132/113 |
| 2,336,717 | 12/1943 | Crimmins | 401/281 X |
| 4,543,913 | 10/1985 | Wilkeson | 401/28 X |
| 4,922,859 | 5/1990 | Durell et al. | 401/28 X |

FOREIGN PATENT DOCUMENTS 2354236  5/1975  Fed. Rep. of Germany ...... 401/184
18961  10/1890  United Kingdom ................ 132/112

Primary Examiner—Steven A. Bratlie
Attorney, Agent, or Firm—Webb, Burden, Ziesenheim & Webb

[57] ABSTRACT

A brush dispenser designed to emit a controlled amount of liquid through and out the ends of or other opening in the middle set of bristles. Selection of the number of bristles being used as conductors can be achieved by adjusting the shaft to which cams are connected. Control of the amount of liquid flowing through the selected bristles can also be achieved by adjustment of the shaft to which the cams are connected. The liquid is contained in a removable container in the handle of the brush. Finger pressure on the removable container activates the liquid flow. A cutout in the handle allows the fingers to contact the liquid-holding container.

17 Claims, 4 Drawing Sheets

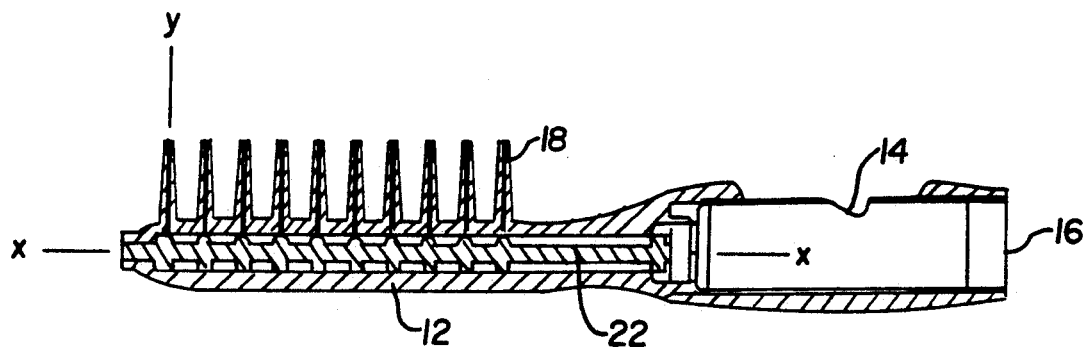
FIG_6
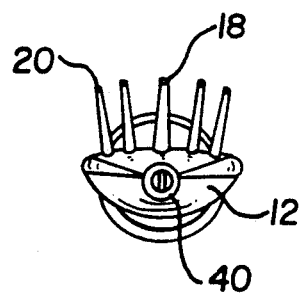
FIG_7
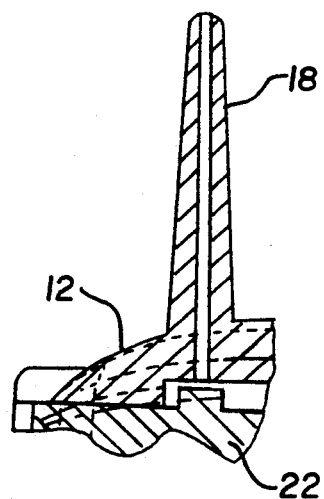
FIG_8

000
LIQUID DISPENSING BRUSH WITH CAM VALVE

BACKGROUND OF THE INVENTION

1. Field of the Invention

This invention relates to brushes and, more particularly, to brushes adapted to dispense liquids.

2. Description of the Prior Art

The prior art discloses a number of brushes by which a liquid can be dispensed. Through either design faults, or manufacturing deficiencies, these brushes have proven to be ineffective for proper application of liquids to the skin of animal pets or the scalp of humans. Typically, these brushes permit only downward flow of the liquid or have proven too cumbersome for normal grooming use; see, for example, U.S. Pat. Nos. 4,543,913; 4,922,859.

The bristles of the prior art brushes are not designed to flow freely through animal fur or human hair. This results in the improper placement of a liquid on the animal skin surface or human scalp and increases the tendency to remove loose hair, thus further reducing the effectiveness of the brush.

Furthermore, these prior art brushes typically control the amount of liquid dispensed through a gravity feed arrangement that changes in the device orientation. Also, proper application is extremely difficult to control when both hands of a user are needed for application.

SUMMARY OF THE INVENTION

Therefore, it is an object of my invention to provide a liquid dispensing brush that easily and effectively permits a controlled amount of liquid to a desired location on animals or humans.

Another object of the invention is to provide a liquid dispensing brush that enables treatment of hard to treat areas of an animal, such as a paw of a dog or cat.

Still another object of the invention is to provide a liquid-dispensing brush that enables liquids of different densities to be applied by the brush.

Briefly, the objects of the invention are attained by a brush-type dispenser having a body with a head and a handle with a plurality of bristles, including a set of bristles having liquid dischargeable openings. The brush includes a finger tip control of liquid flow and an adjustable set of cams for quantity control and bristle selection. A flexible liquid container is secured in the handle of the brush and connected to a hollow passage running through the head of the brush. The passage receives a shaft and cam assembly parallel to the set of bristles having liquid discharging openings which are in fluid communication with the passage. Adjustment of the cams for desired bristle selection and quantity flow is accomplished by adjusting an end of the shaft, which is accessible at the front of the brush.

BRIEF DESCRIPTION OF THE DRAWINGS

FIG. 6 is a perspective view, partially in section, of the liquid dispensing brush shown in FIG. 1;

FIG. 7 is a front view of the liquid dispensing brush shown in FIG. 1;

FIG. 8 is a section of a portion of the liquid dispensing brush shown in FIG. 1;

DETAILED DESCRIPTION OF THE INVENTION

A liquid dispensing brush 10 made in accordance to the present invention is shown in FIGS. 1–11.

Figure 4:
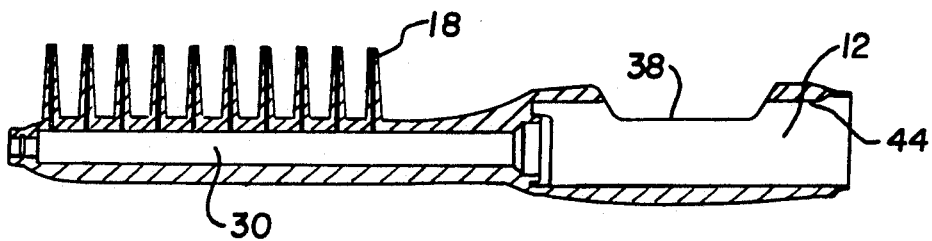
FIG. 4 is a section taken along lines IV—IV of FIG. 2.

The liquid dispensing brush 10 (FIG. 1) includes a housing 12 having a head and handle with a plurality of bristles, including a set of bristles having liquid dischargeable openings 18, and a plurality of solid bristles 20. An open topped flexible liquid supply bottle 14 is located in the handle of the brush housing 12, and is held secure by an end cap 16. The flexible liquid supply bottle 14 is positioned in the handle using slot 42 of flexible liquid supply bottle 14 and aligning projection 44 of the brush housing 12. A cam shaft with cams 22 (FIG. 5) is contained in a hollow chamber 30 (FIG. 4). The hollow chamber 30 is parallel with the set of bristles having liquid dischargeable openings 18. The cam shaft with cams 22 includes a slotted end connector 32 and a set of cams 26.

Figure 1:
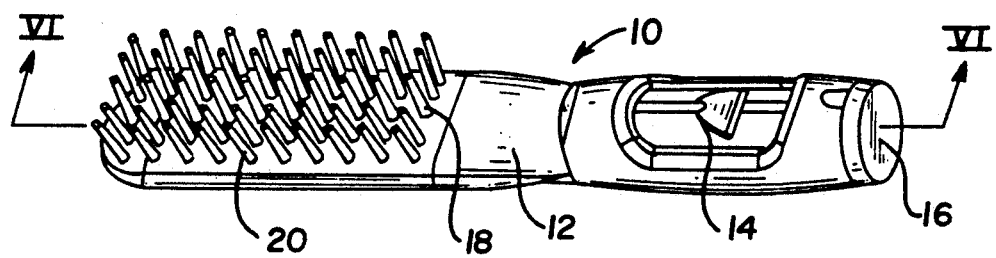
FIG. 1 is a perspective view of a liquid dispensing brush made in accordance with the present invention.
Figure 2:
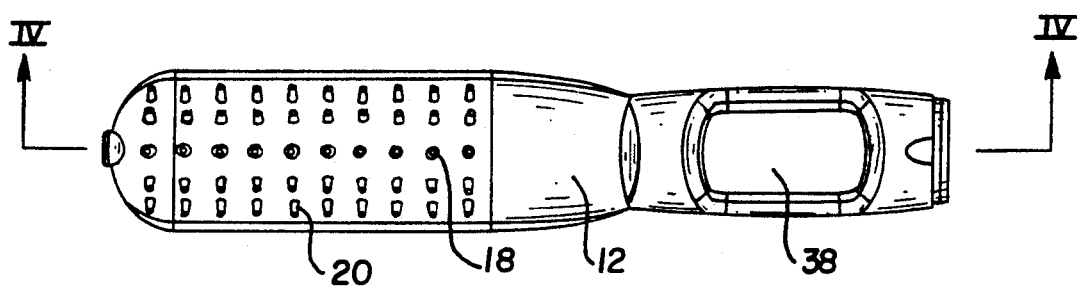
FIG. 2 is a bottom view of a brush housing of the liquid dispensing brush shown in FIG. 1.
Figure 3:
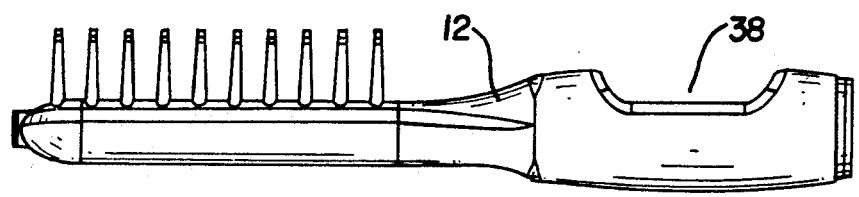
FIG. 3 is a side view of the brush housing shown in FIG. 2.
Figure 5:
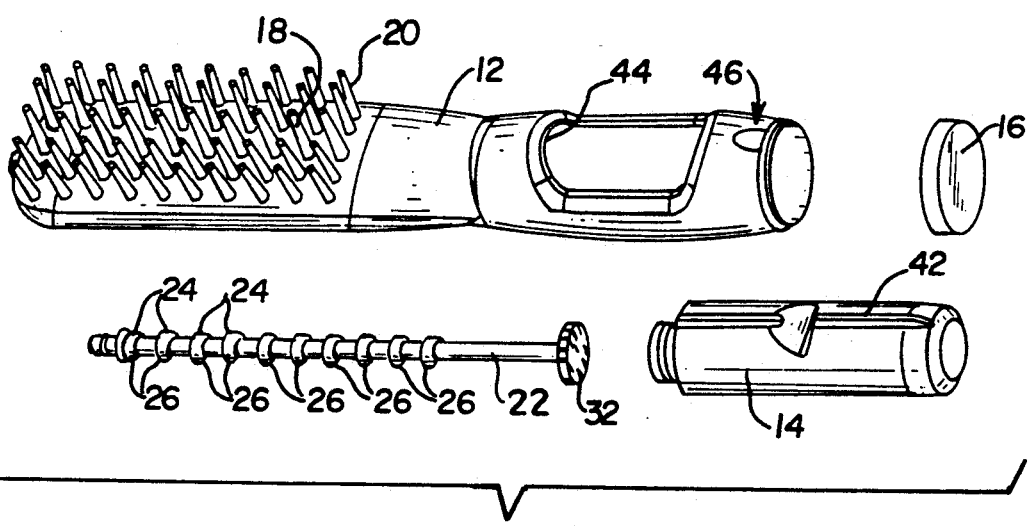
FIG. 5 is an exploded view of the liquid dispensing brush shown in FIG. 1.

FIG. 5 shows an exploded view of the liquid dispensing brush 10 (FIG. 1). End cap 16 is of the snap-on type, with slot 46 used to remove end cap 16 as required to gain access to flexible liquid supply bottle 14. Proper position of the flexible liquid supply bottle 14 in the handle of the brush housing 12 is controlled using alignment slot 42 and housing alignment projection 44. Slotted end connector 32 of cam shaft 22 has openings to allow liquid flow from liquid supply bottle 14. The cams 26 are designed to be positioned in the hollow passage 30 (FIG. 4) parallel to the set of bristles having liquid dischargeable openings 18. The function of the cams 26 for controlling quantity and bristle selection will apparent in FIGS. 9–11.

FIG. 6 shows a partial section perspective view of the liquid dispensing brush 10. Finger pressure applied to the flexible liquid supply bottle 14, accessed at the cut-out section of housing handle 38 (FIG. 3), activates liquid flow in the hollow chamber 30.

Liquid flows through the slotted end connector 32 into the chamber 30 (FIG. 5), around the cam shaft assembly 22, and out the bristles having liquid dischargeable openings 18. The quantity of liquid flow and the bristle selection is controlled by rotating the cam shaft assembly 22 using adjusting slot 40 (FIG. 7) located at the front of a brush housing 12. When brushing, the solid bristles 20 act to separate the hairs and allow the hollow bristles 18 to reach the skin or scalp.

Figure 9:
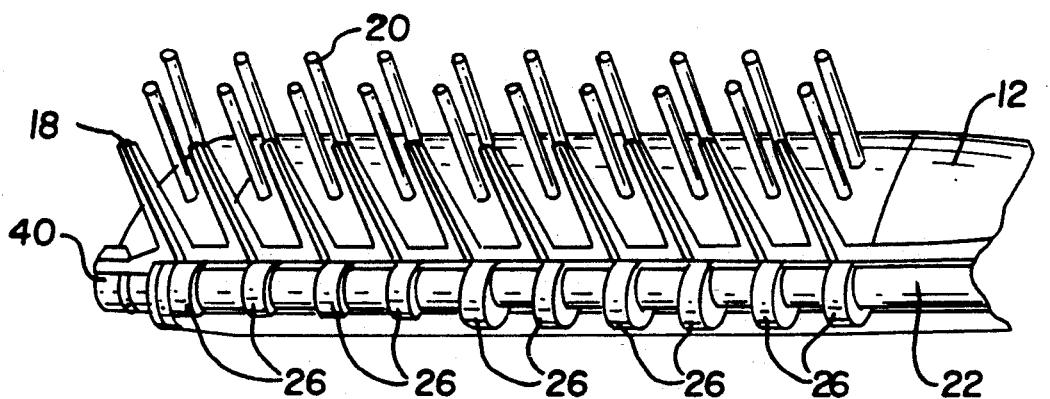
FIG. 9 is an exploded view showing a cam arrangement in a first open position.
Figure 10:
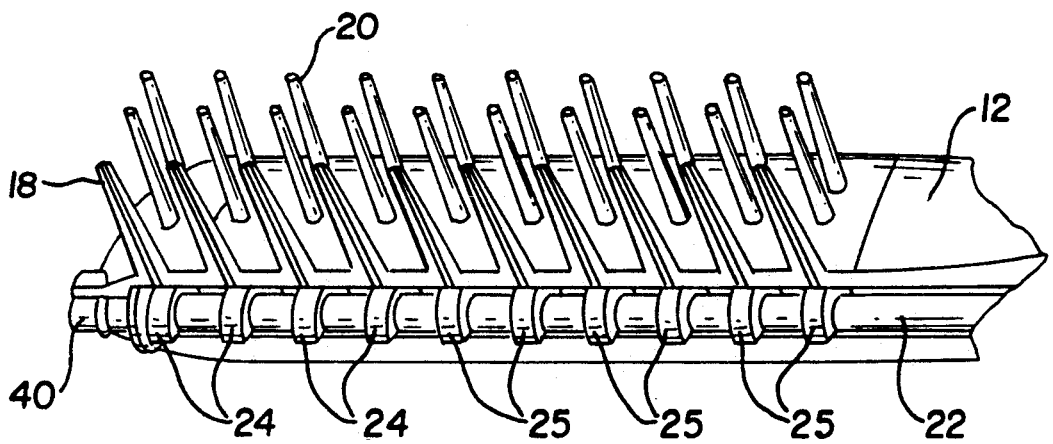
FIG. 10 is an exploded view showing the cam arrangement in a second partially open position.
Figure 11:
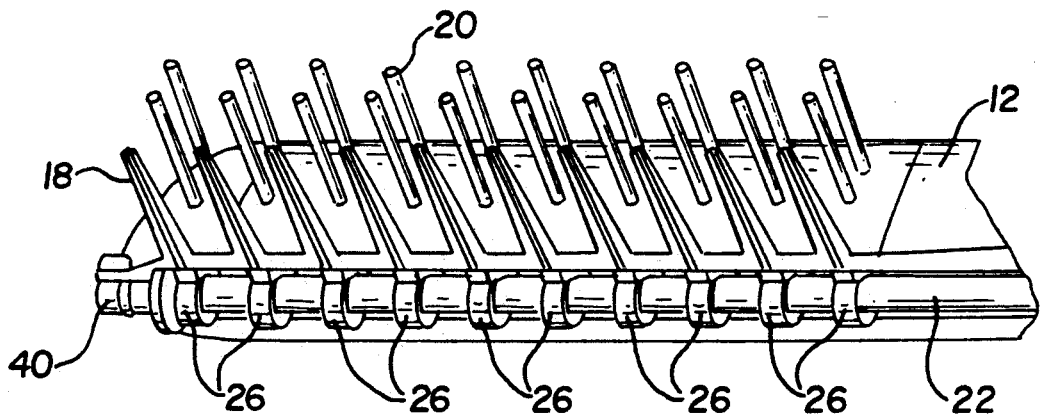
FIG. 11 is an exploded view showing the cam arrangement in a closed position.

FIGS. 9–11 show the cam shaft assembly 22 in various positions in relation to bristles having liquid dischargeable openings 18. The shaft extends in a first longitudinal axis X and the dischargeable openings 18 extend in a second longitudinal direction Y that is perpendicular to the X axis as shown in FIG. 6. Rotating the cam shaft about the X axis varies the distance of the cam in the Y direction from the respective dischargeable openings 18 as shown in FIGS. 9–11. FIG. 9 shows the cams 26 in an open position. This is accomplished by rotating the cam shaft assembly 22 using the slot 40 in the end of the cam shaft assembly 22. In this position, the quantity of liquid flowing out of all of the liquid dischargeable openings 18 can then be adjusted by slightly adjusting the cam shaft assembly 22 using slot 40. FIG. 10 shows the cam shaft assembly 22 in a partially open position. Cams 24 are positioned to allow liquid to flow out the front four bristles having liquid dischargeable openings 18 while cams 25 are in position to block liquid flow from the remaining bristles having liquid discharging openings 18. This again is accomplished by rotating the cam shaft assembly 22 using slot 40. FIG. 11 shows the cam arrangement in a closed position. All liquid-flow through the bristles having liquid-dischargeable openings 18 is stopped.

Accordingly, it is to be understood that the present invention is not limited to that precisely as shown in the drawings and as described in detail herein above.

What I claimed is:

1. A liquid dispensing brush comprising:

a housing having a head, a hollow head chamber contained within said head and a handle attached to said head, said handle including an open-topped container receiving section;

a first bristle having a passageway passing therethrough attached to said head, said passageway including an inlet portion and an outlet portion, said inlet portion of said passageway intersecting said head chamber;

a shaft received by said head chamber having a longitudinal axis passing therethrough;

a cam attached to said shaft and received in said head chamber and positioned adjacent to said inlet portion of said bristle passageway;

an open-topped container for holding a fluid received by said handle in said container receiving section, said container having a flexible portion, whereby said flexible portion of said container exposed by said open-topped container receiving section, wherein said shaft is positioned externally of said open-topped container;

means for coupling said container to said head chamber so that said container is in fluid communication with said head chamber; and means for rotating said shaft about the longitudinal axis and adjusting the cam position with respect to said inlet portion of said first bristle passageway positioned externally of said open-topped container, so that when said cam is in a first position, said cam blocks [and]said inlet portion of said passageway of said first bristle and when said cam is in a second position, said cam is spaced apart from said inlet portion of said first bristle passageway so that said container, said head chamber and said bristle passageway are in fluid communication and when said exposed flesible portion of said container is depressed, a fluid can be forced from said container through said chamber and said first bristle passageway so that the fluid can exit said outlet portion of said passageway.

2. The liquid dispensing brush of claim 1 wherein said container is an open-topped bottle.

3. The liquid dispensing brush of claim 2 wherein said bottle is made of plastic.

4. The liquid dispensing brush of claim 1 wherein said open-topped container receiving section includes a handle chamber adapted to receive said container, said handle chamber and said head chamber forming a housing chamber.

5. The liquid dispensing brush of claim 1 wherein said brush includes a plurality of first bristles each having a passageway passing therethrough attached to said head and extending along the longitudinal axis, each passageway including an inlet portion and an outlet portion, said inlet portion of said passageway intersecting said head chamber and a plurality of cams attached to said shaft and received in said head chamber and positioned adjacent to respective said inlet portions of said first bristle passageways and means for rotating said shaft about the longitudinal axis and adjusting each of said cam positions with respect to respective said inlet portions of said first bristle passageways, so that when said cams are in a first position, said cams block said inlet portions of respective said passageways of said first bristles and when said cams are in a second position, said cams are spaced apart from said inlet portions of respective said bristle passageways so that said container, said head chamber and said first bristle passageways are in fluid communication and when said exposed flexible portion of said container is depressed, a fluid can be forced from said container through said chamber and said first bristle passageways so that the fluid can exit said outlet portions of said passageways.

6. The liquid dispensing brush of claim 1 wherein said means for rotating said shaft includes a slotted adjustment member positioned at a front end of said housing and attached to said shaft, whereby rotation of said slotted member about the longitudinal axis adjusts a spacing between said cam and said inlet portion of said first bristle passageway thereby adjusting the flow of fluid through said first bristle passageway.

7. The liquid dispensing brush of claim 1 further comprising a second solid bristle attached to the head.

8. The liquid dispensing brush of claim 5 further comprising a plurality of second solid bristles attached to said head.

9. The liquid dispensing brush of claim 8 wherein said first bristles and second bristles are arranged in rows on said head and said first bristles are arranged along a center row.

10. The liquid dispensing brush of claim 1 wherein said shaft includes two ends pivotally attached to said housing.

11. The liquid dispensing brush of claim 1 wherein said container includes an aligning projection and said handle includes a slot that receives said aligning projection.

12. The liquid dispensing brush of claim 1 further comprising a slotted end connector having openings attached to said shaft whereby when said flexible portion of said container is depressed, liquid flows through the slotted end connector and into said chamber.

13. The liquid dispensing brush of claim 1 wherein the spacing of said cam with respect to said bristle passageway is along a second longitudinal axis that is perpendicular to said first longitudinal axis.

14. The liquid dispensing brush of claim 13 wherein rotating said shaft about said first longitudinal axis varies the distance of said cam in the second longitudinal direction from said bristle passageway.

15. The liquid dispensing brush of claim 5 wherein the spacing of each of said cams with respect to a respective bristle passageway is along a second longitudinal axis that is perpendicular to said first longitudinal axis.

16. The liquid dispensing brush of claim 15 wherein rotating said shaft about said first longitudinal axis varies the distance of each of said cams in said second longitudinal axis from said respective bristle passageway.

17. The liquid dispensing brush of claim 16 further comprising a slotted end connector having openings attached to said shaft whereby when said flexible portion of said container is depressed, liquid flows through the slotted end connector and into said chamber.

* * * * *

UNITED STATES PATENT AND TRADEMARK OFFICE
CERTIFICATE OF CORRECTION

PATENT NO. : 5,297,882
DATED : March 29, 1994
INVENTOR(S) : James R. Kornides

It is certified that error appears in the above-indentified patent and that said Letters Patent is hereby corrected as shown below:

Column 2 Line 45 after "will" insert --become--.

Claim 1 Line 40 Column 3 after "container" insert --is--.

Claim 1 Line 52 Column 3 after "blocks" delete "[and]".

Signed and Sealed this

Twenty-sixth Day of July, 1994

Attest:

BRUCE LEHMAN

*Attesting Officer*  *Commissioner of Patents and Trademarks*